Patented May 28, 1935

2,003,204

UNITED STATES PATENT OFFICE 2,003,204

CARDIO-ACTIVE GLUCOSIDES OF DIGITALIS LANATA AND A PROCESS OF MAKING SAME

Walter Kreis, Basel, Switzerland, assignor to firm "Chemical Works Formerly Sandoz", Basel, Switzerland No Drawing. Application July 19, 1933, Serial No. 681,219. In Switzerland July 22, 1932

13 Claims. (Cl. 260—25)

The present invention relates to cardio-active glucosides of digitalis lanata and to a process of making same and is based on the observation of the applicant, that the glucosides of digitalis lanata contain an acetyl radical in the molecule.

It has been found that by working under the conditions set forth below, it is possible to split off the acetyl group and to obtain compounds that are better soluble in water without altering the remaining molecule of the glucoside or its physiological activity.

One object of the present invention is a process for splitting off the acetyl group from acetylated glucosides from digitalis lanata.

Another object of the present invention is a process for desacetylating acetylated glucosides from digitalis lanata by means of a treatment with desacetylating agents of alkaline nature, preferably at a low temperature, in an aqueous solution or suspension and in presence of organic solvents miscible with water.

Another object of the invention is a process for desacetylating acetylated glucosides during their extraction from the fresh or dried drug.

Still another object of the invention is to apply the said desacetylating process on genuine glucosides of digitalis lanata.

Still another object of the invention is to apply the said desacetylating process on glucose-free acetylated glucosides that have been obtained from genuine glucosides from digitalis lanata by an enzymatic hydrolysis.

Still another object of the present invention are the desacetylated glucosides from digitalis lanata prepared from acetylated genuine glucosides by means of a desacetylating process.

As starting material acetylated glucosides from digitalis lanata are used. Such glucosides are for instance the genuine glucosides A, B and C that can be isolated from digitalis lanata by the process described in U. S. specification No. 1,923,491 or the glucose-free glucosides prepared by treating the above cited genuine glucoside with enzymes. Such glycosides can be used in pure form or in presence of impurities. Also mixtures of several acetylated glucosides, like their isomorphously crystallizing mixture, may be employed as starting products. It is also possible to desacetylate the said glucosides during their extraction process from the drug.

Particularly suitable glucosides for carrying out the present process are the glucosides A, B, and C from digitalis lanata, possessing the formula $C_{49}H_{76}O_{19}.H_2O$ or $C_{49}H_{76}O_{20}$. It is further possible to use glucosides that have been previously subjected to the action of enzymes. Such glucosides are free from glucose and correspond to the formulæ $C_{43}H_{66}O_{14}$ or $C_{43}H_{66}O_{15}$. They still contain an acetyl radical, which can be split off according to the process described below in detail.

In order to split off the acetyl group, the acetylated glucosides from digitalis lanata are subjected to the action of desacetylating agents.

As desacetylating agents preferably compounds of alkaline nature such as alkalimetal hydroxides and—carbonates, earth alkali metal hydroxides and—carbonates, disodium-phosphate and other compounds of alkaline nature may be used.

The treatment of the acetylated glucosides with desacetylating agents is carried out in an aqueous medium preferably in presence of such organic solvents, that are miscible with water, such as methanol, ethanol, acetone, dioxane, pyridine, glycolmonomethylether and other similar compounds.

The acetylated glucosides may be subjected to the said desacetylating treatment at low or at an elevated temperature and in form of solutions or of suspensions. The desacetylating process is preferably carried out at temperatures of 10° to 40° C., but also other temperatures may be used.

In carrying out the said operation it is preferable to use not more than the necessary quantity of splitting agent, although a slight excess thereof may also be used.

The desacetylating glucosides can be islated from their solutions in any usual way, for instance by filtering them from the solution or by evaporating the solution to dryness, whereby the evaporation can be carried out in vacuo and at a low or elevated temperature.

By using as starting products the genuine glucosides A, B and C of digitalis lanata, quite new glucosides are obtained.

The desacetylated glucoside A is a white amorphous powder. One part of it is soluble in about 15 parts of methanol or in about 80 parts of ethanol or in about 3000 parts of water. It is completely insoluble in ether. Its analysis has given the following values:

$C = 59.8$ to $60.8\%$    $H = 7.8$ to $8.3\%$ 0.225 g. of the substance use 2.4 cc. of $\frac{1}{10}$-n sodium hydroxide solution on lactone titration, which shows that the molecular weight of the glucoside must be of about 936. Its specific optical behaviour in a 75% ethanol solution is of $$(\alpha)_D^{20°} = +10.4°$$

$C = 1.057$. By Keller-Kiliani's color reaction, consisting in underlaying with concentrated sulphuric acid a solution of 2–3 mg. of the product in 5 cc. of glacial acetic acid to which one drop of iron chloride solution 1:20 has been added, the new glucoside gives in sulphuric acid a brown zone, whereas in glacial acetic acid a blue to green-blue coloration, characteristic for digitoxose, is obtained. On careful hydrolysis with dilute acids about 40% of the aglucone (digitoxigenin), about 31% of digitoxose and about 33% of a well crystallized disaccharide are obtained. The disaccharide $C_{12}H_{22}O_9$ can further be split by means of a strong hydrolysis into digitoxose and glucose according to the formula:

$$C_{12}H_{22}O_9 + H_2O = C_6H_{12}O_4 + C_6H_{12}O_6$$

The new glucoside can therefore be split on complete acid hydrolysis according to the following formula:

$$\underset{\text{digitoxigenin}}{C_{47}H_{74}O_{18}} + 4H_2O = C_{23}H_{34}O_4 + \underset{\text{digitoxose}}{3C_6H_{12}O_4} + \underset{\text{glucose}}{C_6H_{12}O_6}$$

By subjecting it to the action of the enzyme contained in the leaves of digitalis purpurea a zymolysis takes place, whereby digitoxin is obtained according to the following reaction formula:

$$C_{47}H_{74}O_{18} + H_2O = \underset{\text{digitoxin}}{C_{41}H_{64}O_{13}} + \underset{}{C_6H_{12}O_6}$$

The desacetylated glucoside B is a white amorphous powder. One part thereof is soluble in about 60 parts of methanol, or in about 500 parts of ethanol or in about 3500 parts of water. It is completely insoluble in ether. Its analysis has given following values:

$$C = 59.2 \text{ to } 59.8\% \qquad H = 7.7 \text{ to } 8.1\%$$

0.245 g. of the substance use 2.6 cc. of $\tfrac{1}{10}$-n sodium hydroxide solution on lactone titration, which shows that the molecular weight of the glucoside must be of about 940. Its specific optical behaviour in 75% ethanol solution is of $$(\alpha)_D^{20°} = +16.3°$$

$C = 1.042$.

By Keller-Kiliani's color reaction the new glucoside gives in sulphuric acid a red zone, whereas in glacial acetic acid a blue to green-blue coloration, characteristic for digitoxose is obtained. On careful hydrolysis with dilute acids about 41% of aglucone (gitoxigenin), about 31% of digitoxose and about 32% of a well crystallized disaccharide are obtained. The disaccharide $C_{12}H_{22}O_9$ can further be split by means of a strong hydrolysis into digitoxose and glucose according to the formula:

$$C_{12}H_{22}O_9 + H_2O = C_6H_{12}O_4 + C_6H_{12}O_6$$

The new glucoside can therefore be split on complete acid hydrolysis according to the following formula:

$$\underset{\text{gitoxigenin}}{C_{47}H_{74}O_{19}} + 4H_2O = C_{23}H_{34}O_5 + \underset{\text{digitoxose}}{3C_6H_{12}O_4} + \underset{\text{glucose}}{C_6H_{12}O_6}$$

By subjecting it to the action of the enzyme contained in the leaves of digitalis purpurea a zymolysis takes place, whereby gitoxin is obtained according to the following reaction formula:

$$C_{47}H_{74}O_{19} + H_2O = \underset{\text{gitoxin}}{C_{41}H_{64}O_{14}} + \underset{\text{glucose}}{C_6H_{12}O_6}$$

The desacetylated glucoside C crystallizes from 75% ethanol or 75% methanol in form of rhombic tables. One part of it is soluble in about 200 parts of methanol, or in about 2500 parts of ethanol or in about 6000 parts of water. It is completely insoluble in ether. Its analysis has given the following values:

$$C = 59.1 \text{ to } 59.8\% \qquad H = 7.7 \text{ to } 8.1\%$$

0.269 g. of the substance use 2.8 cc. of $\tfrac{1}{10}$-n sodium hydroxide solution on lactone titration, which shows that the molecular weight of the glucoside must be of about 960. Its specific optical behaviour in a 75% ethanol solution is of $$(\alpha)_D^{20°} = +12°$$

$C = 1.84$. By Keller-Kiliani's color reaction the new glucoside gives in sulphuric acid a brown zone, whereas in glacial acetic acid a blue to green blue coloration, characteristic for digitoxose, is obtained. On careful hydrolysis with dilute acids about 41% of aglucone (digoxigenin), about 31% of digitoxose and about 32% of a well crystallized disaccharide are obtained. The disaccharide $C_{12}H_{22}O_9$ can further be decomposed in a strong hydrolyzing medium into digitoxose in glycose according to the formula:

$$C_{12}H_{22}O_9 + H_2O = C_6H_{12}O_4 + C_6H_{12}O_6$$

The new glucoside can, therefore, be split on complete acid hydrolysis according to the following formula:

$$\underset{\text{digoxigenin}}{C_{47}H_{74}O_{19}} + 4H_2O = C_{23}H_{34}O_5 + \underset{\text{digitoxose}}{3C_6H_{12}O_4} + \underset{\text{glucose}}{C_6H_{12}O_6}$$

By subjecting it to the action of the enzyme contained in the leaves of digitalis purpurea a zymolysis takes place, whereby digoxin is obtained according to the following reaction formula:

$$C_{47}H_{74}O_{19} + H_2O = \underset{\text{digoxin}}{C_{41}H_{64}O_{14}} + \underset{\text{glucose}}{C_6H_{12}O_6}$$

Instead of the genuine glucosides used above, it is further possible to use the glucose-free products obtained therefrom. Such glucose-free products that still contain the acetyl group are obtained from the genuine glucosides of digitalis lanata, by subjecting them to the action of enzymes.

By using as starting product the glucose-free glucoside obtained from the genuine glucoside A of digitalis lanata, digitoxin is obtained according to the formula:

$$C_{43}H_{66}O_{14} + NaOH = \underset{\text{digitoxin}}{C_{41}H_{64}O_{13}} + CH_3COONa$$

By using as starting product the glucose-free glucoside obtained from the genuine glucoside B of digitalis lanata, gitoxin is obtained according to the formula:

$$C_{43}H_{66}O_{15} + NaOH = \underset{\text{gitoxin}}{C_{41}H_{64}O_{14}} + CH_3COONa$$

By using as starting product the glucose-free glucoside obtained from the genuine glucoside C of digitalis lanata, digoxin is obtained according to the formula:

$$C_{43}H_{66}O_{15} + NaOH = \underset{\text{digoxin}}{C_{41}H_{64}O_{14}} + CH_3COONa$$

The present process allows therefore to transform acetylated glucosides into some quite new or already known valuable cardio-active glucosides. They possess the property to be generally better soluble in water than the starting products and are useful compounds for therapeutical applications.

The following examples, without being limitative, illustrate the present process and the manner in which it can be carried out, the parts being by weight.

*Example 1*

2.2 parts of the lanata-glucoside A (air-dry), prepared according to the process described in the U. S. specification No. 1,923,491, are dissolved in 50 parts of methanol. To this solution 50 parts of a $$\frac{4.23}{100}$$

n aqueous calciumhydroxide solution are added. The flask containing the mixture is closed and allowed to stand over night at room temperature, whereby the alkaline reaction disappears and the reaction product partially precipitates in an amorphous form. 200 parts of water are then added to the mixture, which is allowed to stand for a short time and is filtered thereupon. The precipitate has, after drying, a weight of 1.7 parts. The filtrate is evaporated in vacuo and taken up in 25 parts of water. The undissolved part is separated by filtration, dried and united with the first fraction. In this manner about 1.9 parts of an acetyl-free product are obtained.

The pure, white substance is sparingly soluble in absolute alcohol and can be washed with the latter, whereby eventually little quantities of the unchanged lanata-glucoside A are solubilized and driven off. The product possesses a far better solubility in water than the starting material, while showing its unchanged physiological activity.

Example 2

Lanata glucoside C, prepared according to the process described in the U. S. specification No. 1,923,491, is subjected to the treatment described in Example 1. By dissolving the reaction product in hot methyl alcohol and cooling down, the acetyl-free product separates as a white, crystalline powder.

Example 3

0.2 part of the glucose-free lanata glucoside A, prepared by enzymatic hydrolysis of the genuine glucoside A, are dissolved in about 6 parts of methanol. To this solution are added 10 parts of a ⅕ n caustic soda lye, the solution being stirred. The acetyl-free product immediately begins to crystallize out. After 2–3 minutes 20 parts of water are added and after 2 further minutes the solution is quickly filtered. The precipitate is washed with water until it becomes neutral and recrystallized from aqueous alcohol. The chemical and physical properties of the product obtained are very similar to those of digitoxin; but it possesses a somewhat greater physiological activity.

What I claim is:—

1. A process for the manufacture of cardio-active digitalis glucosides, consisting in subjecting acetylated glucosides from digitalis lanata to a treatment with desacetylating agents of an alkaline nature selected from the class consisting of alkali and earth-alkali metal hydroxides and carbonates and disodium phosphate in presence of water.

2. A process for the manufacture of cardio-active digitalis glucosides, consisting in subjecting acetylated glucosides from digitalis lanata to a treatment with desacetylating agents of an alkaline nature selected from the class consisting of alkali and earth-alkali metal hydroxides and carbonates and disodium phosphate in presence of water and an organic solvent, miscible with water.

3. A process for the manufacture of cardio-active digitalis glucosides, consisting in subjecting acetylated glucosides from digitalis lanata to a treatment with desacetylating agents of an alkaline nature selected from the class consisting of alkali and earth-alkali metal hydroxides and carbonates and disodium phosphate in presence of water and methanol.

4. A process for the manufacture of cardio-active digitalis glucosides, consisting in treating acetylated glucosides from digitalis lanata with an alkali metal hydroxide in presence of water and methanol.

5. A process for the manufacture of cardio-active digitalis glucosides, consisting in treating acetylated glucosides from digitalis lanata with sodium hydroxide in presence of water and methanol.

6. A process for the manufacture of cardio-active digitalis glucosides, consisting in treating the mixture of genuine glucosides from digitalis lanata with sodium hydroxide in presence of water and methanol.

7. A process for the manufacture of a new cardio-active digitalis glucoside, consisting in treating the genuine glucoside A from digitalis lanata with sodium hydroxide in presence of water and methanol.

8. A process for the manufacture of a new cardio-active digitalis glucoside, consisting in treating the genuine glucoside B from digitalis lanata with sodium hydroxide in presence of water and methanol.

9. A process for the manufacture of a new cardio-active digitalis glucoside, consisting in treating the genuine glucoside C from digitalis lanata with sodium hydroxide in presence of water and methanol.

10. The desacetylated genuine glucosides of digitalis lanata being white powders soluble in water, containing about 60% of C and about 8% of H and yielding on careful acid hydrolysis 40–41% of an aglucone, about 31% of digitoxose and about 32–33% of a well crystallized disaccharide $C_{12}H_{22}O_9$, composed of glucose and digitoxose, possessing cardio-active properties and being useful for therapeutical applications.

11. The desacetylated genuine glucoside A of digitalis lanata which is a white amorphous powder, one part of which is soluble in about 3000 parts of water which contains about 60% of C and about 8% of H, which yields on careful acid hydrolysis about 40% of digitoxigenin, about 31% of digitoxose and about 33% of a crystallized disaccharide $C_{12}H_{22}O_9$ composed of glucose and digitoxose, which possesses cardio-active properties and is useful for therapeutical applications.

12. The desacetylated genuine glucoside B of digitalis lanata, which is a white amorphous powder, one part of which is soluble in about 3500 parts of water, which contains about 60% of C and about 8% of H, which yields on careful acid hydrolysis about 41% of digitoxigenin, about 31% of digitoxose and about 33% of a crystallized disaccharide $C_{12}H_{22}O_9$ composed of glucose and digitoxose, which possesses cardio-active properties and is useful for therapeutical applications.

13. The desacetylated genuine glucoside C of digitalis lanata, which is a white compound crystallizing in form of rhomboedric plates from aqueous methanol, one part of which is soluble in about 6000 parts of water, which contains about 60% of C and about 8% of H, which yields on careful acid hydrolysis about 41% of digoxigenin, about 31% of digitoxose and about 33% of a crystallized disaccharide $C_{12}H_{22}O_9$ composed of glucose and digitoxose, which possesses cardio-active properties and is useful for therapeutical applications.

WALTER KREIS.

CERTIFICATE OF CORRECTION.

Patent No. 2,003,204.  May 28, 1935.

WALTER KREIS.

It is hereby certified that error appears in the printed specification of the above numbered patent requiring correction as follows: Page 2, second column, lines 15 and 16, for "in glycose" read and glucose; and page 3, second column, line 58, claim 12, for "digitoxigenin" read gitoxigenin; and that the said Letters Patent should be read with these corrections therein that the same may conform to the record of the case in the Patent Office.

Signed and sealed this 17th day of September, A. D. 1935.

Leslie Frazer
Acting Commissioner of Patents.

(Seal)